US007333133B2

(12) United States Patent
Chang et al.

(10) Patent No.: US 7,333,133 B2
(45) Date of Patent: Feb. 19, 2008

(54) RECURSIVE LEAST SQUARES APPROACH TO CALCULATE MOTION PARAMETERS FOR A MOVING CAMERA

(75) Inventors: Samuel Henry Chang, Rockville, MD (US); J. Joseph Fuller, South Charleston, WV (US); Ali Farsaie, Potomac, MD (US); Leslie Ray Elkins, Derwood, MD (US)

(73) Assignee: Spatial Integrated Systems, Inc., Rockville, MD (US)

( * ) Notice: Subject to any disclaimer, the term of this patent is extended or adjusted under 35 U.S.C. 154(b) by 840 days.

(21) Appl. No.: 10/814,711

(22) Filed: Mar. 31, 2004

(65) Prior Publication Data

US 2004/0257452 A1    Dec. 23, 2004

(51) Int. Cl.
*H04N 5/228* (2006.01)
*H04N 17/02* (2006.01)

(52) U.S. Cl. .............................. 348/208.99; 348/208.1; 348/187

(58) Field of Classification Search ........... 348/208.99, 348/208.1, 208.5, 187
See application file for complete search history.

(56) References Cited

U.S. PATENT DOCUMENTS

| 5,699,440 | A | * | 12/1997 | Carmeli | 382/100 |
| 6,016,161 | A | * | 1/2000 | Robinson | 348/187 |
| 6,377,298 | B1 | * | 4/2002 | Scheele et al. | 348/187 |
| 7,250,965 | B2 | * | 7/2007 | Zhang | 348/187 |

OTHER PUBLICATIONS

J. Denzler, M. Zobel and H. Niemann, "On optimal camera parameter selection in Kalman filter based object tracking", Pattern Recognition, 24th DAGM Symposium, Zurich, Switzerland, p. 17-25, 2002.
D. Koller, G. Klinker, E. Rose, D. Breen, R. Whitaker and M. Tuceryan, "Automated camera calibration and 3D egomotion estimation for augmented reality applications".
J.S. Goddard, M.A. Abidi, "Pose and motion estimation using dual quaternion-based extended Kalman filtering".
C. Venter, B. Herbst, Structure from motion estimation using a non-linear Kalman filter.
T. Okuma, K. Sakaue, H. Takemura, N. Yokova, "Real-time camera parameter estimation from images for a mixed reality system", International Conference on Pattern Recognition (ICPR '00)- vol. 4, Sep. 3-8, 2000, Barcelona, Spain.

(Continued)

*Primary Examiner*—Tuan Ho
*Assistant Examiner*—Hung H. Lam
(74) *Attorney, Agent, or Firm*—Fay Sharpe LLP

(57) ABSTRACT

A method and system for estimating camera motion parameters and determining a filter to correct for camera motion errors. The estimating method and system includes obtaining an observation point set including a plurality of observed point vectors, computing a plurality of motion output vectors by performing a recursive least squares (RLS) process based on a plurality of motion parameter vectors, and comparing the plurality of motion output vectors to the plurality of observed point vectors. The filter determining method and system includes determining a plurality of desired motion point vectors, computing a plurality of estimated motion point vectors by means of an RLS algorithm, and computing the filter based on a difference between the plurality of estimated motion point vectors and the plurality of desired motion point vectors.

17 Claims, 8 Drawing Sheets

OTHER PUBLICATIONS

T.S. Huang, "Image sequence analysis", Spring-Verlag Berlin Heidelberg, 1981.

S. Chang, "Rigid object motion parameter estimation from a dynamic image sequence", Ph.D. dissertation, George Mason University, Fairfax, VA, 1997.

J.K. Cheng and T.S. Huang, Image registration by matching relational structures, Pattern Recognition, 17 (1): 149-159, 1984.

Z. Zhang, R. Deriche, O. Faugeras and Q.T. Luong, "A robust technique for matching two uncalibrated images through the recovery of the unknown epipolar geometry", INRIA research report, May 1994.

R. Tsai, "An efficient and accurate camera calibration technique for 3D machine vision", In proceedings CVPR '86, Miami Beach, Florida, pp. 364-374, IEEE, Jun. 1986.

T.S. Huang and O.D. Faugeras, "A theory of self-calibration of a moving camera", The international Journal of Computer Vision, 1992.

Q.T. Luong, O.D. Faugeras, "Self-calibration of a moving camera from point correspondences and fundamental matrices", International Journal of Computer Vision, 1, 5 40 (1).

* cited by examiner

RECURSIVE LEAST SQUARES APPROACH TO CALCULATE MOTION PARAMETERS FOR A MOVING CAMERA

BACKGROUND

The present invention subject matter relates to methods and systems for reconstructing 3-dimensional objects from sequences of 2-dimensional images. It finds particular application in conjunction with the estimation of camera motion parameters from data obtained with a moving camera, and will be described with particular reference thereto. However, it is to be appreciated that it is also amenable to other like applications.

An increase in quality, coupled with a decrease in price of digital camera equipment has led to growing interest in reconstructing 3-dimensional objects from sequences of 2-dimensional images. Further, the ready availability of high quality and low price digital cameras has led to the development of models and systems that allow the capture of accurate 3-D spatial data from a sequence of 2-D images. One approach has been to collect the sequence of 2-D images from an object space by moving the camera along a predetermined path. Using the image sequence and the concepts of triangulation and parallax, 3-D spatial data from the object space may be recovered.

The quality of the 3-D reconstruction of the object space is dependent on many factors. Among them are resolution of the sensors used, lighting conditions, the object details, and calibration errors. There are several sources that contribute to calibration errors such as, e.g., inaccuracies inherent in the camera lens, including inaccuracies in the lens specifications, and inaccuracies in the means used to move the camera along the desired path. Therefore, it is essential for proper calibration, to estimate error introduced by camera movement, and to provide algorithms to remove or compensate for this error. This process is referred to hereinafter as moving camera calibration.

Moving camera calibration consists primarily of two steps. The first step is to use a sequence of images to estimate the 3-D motion parameters of a moving camera, and the second step is to design a filter to correct the error between the desired motion and the estimated motion. The problems of camera parameter estimation have been addressed by a wide range of researchers. Their approaches have been successful in systems with little or no noise. However, in most cases, the 3-D transformation has been modeled as a nonlinear stochastic system, and it is necessary to estimate the state variables from noisy observations.

There are several sources that contribute to observation noise, including camera motion, projection noise, and/or random disturbances from a moving object. To solve the observation noise problem, a Kalman filter (IEKF) has been widely used as a nonlinear estimator. For example, Denzier and Zobel use a Kalman filter to estimate camera parameter with a selected focal length (*On optimal camera parameter selection in Kalman filter based object tracking*, by J. Denzler, M. Zobel and H. Niemann, *Pattern Recognition*, 24th DAGM Symposium, Zurich, Switzerland, pp. 17-25, 2002). Koller and Klinker use an extended Kalman filter to estimate the motion of the camera and the extrinsic camera parameters (*Automated camera calibration and 3D egomotion estimation for augmented reality applications* by D. Koller, G. Klinker, E. Rose, D. Breen, R. Whitaker and M. Tuceryan, *7th International Conference on Computer Analysis of Images and Patterns* (CAIP-97), Kiel, Germany, Sep. 10-12, 1997). Goddard and Abidi use dual quaternion-based iterated extended Kalman filter to estimate relative 3-D position and orientation (pose), (*Pose and motion estimation using dual quaternion-based extended Kalman filtering* by J. S. Goddard, M. A. Abidi, *A Dissertation Presented for the Doctor of Phiosophy Degree*, The University of Tennessee, Knoxville). Venter and Herbst use an unscented Kalman filter to estimate the motion of an object from a video sequence under perspective projection (*Structure from motion estimation using a non-linear Kalman filter* by C. Venter, B. Herbst, Dept. of Electronic Engineering and Dept. of Applied Mathematics, University of Stellenbosch, 7600, South Africa). The above-described references are incorporated herein by reference.

The accuracy of camera motion models depends primarily on two sets of parameter estimates. The first set of parameters includes lens parameters such as, e.g., focal length, principal point, and distortion parameters. The second set of parameters includes a set of motion parameters that enables the comparison of a moving camera's theoretically determined physical location to a desired location.

The present invention is directed toward improving the accuracy of the second set of parameters, i.e. the estimation of the set of 3-D motion parameters from data obtained with a moving camera. A method is provided that uses Recursive Least Squares (RLS) for camera motion parameter estimation with observation noise. This is accomplished by calculation of hidden information through camera projection and minimization of the estimation error. The present invention also provides a method for designing a filter, based on the motion parameters estimates, to correct for errors in the camera motion.

SUMMARY

In accordance an exemplary embodiment, there is provided a method for estimating camera motion parameters. The method comprises obtaining an observation point set including a plurality of observed point vectors, computing a plurality of motion output vectors by performing a recursive least squares (RLS) process based on a plurality of motion parameter vectors, and comparing the plurality of motion output vectors to the plurality of observed point vectors.

There is also provided a method for determining a filter to correct for camera motion errors. The filter determining method comprises determining a plurality of desired motion point vectors, computing a plurality of estimated motion point vectors by means of an RLS algorithm, and computing the filter based on a difference between the plurality of estimated motion point vectors and the plurality of desired motion point vectors.

There is further provided a system for estimating and filtering camera motion parameters. The system comprises a movable digital camera for generating a plurality of 2-dimensional images of a scene or object, a control means for translating and rotating the camera along a predetermined trajectory, and a computer system for receiving and processing the plurality of 2-dimensional images. The computer system includes a user interface for receiving instructions from a user and for providing output to a user, an image input means for receiving the plurality of 2-dimensional images from the camera, a storage means for storing programs and the plurality of images, a program to determine a desired motion, a program to compute an estimated motion by means of an RLS program, a program to compute a filter rotation matrix and a filter translation vector based on the difference between the estimated motion and the desired motion, and a program to compute a corrected output based on the filter.

BRIEF DESCRIPTION OF THE DRAWINGS

The invention may take form in various components and arrangements of components, and in various process operations and arrangements of process operations. The drawings are only for the purpose of illustrating preferred embodiments and are not to be construed as limiting the invention.

DETAILED DESCRIPTION OF PREFERRED EMBODIMENT(S)

Figure 1:
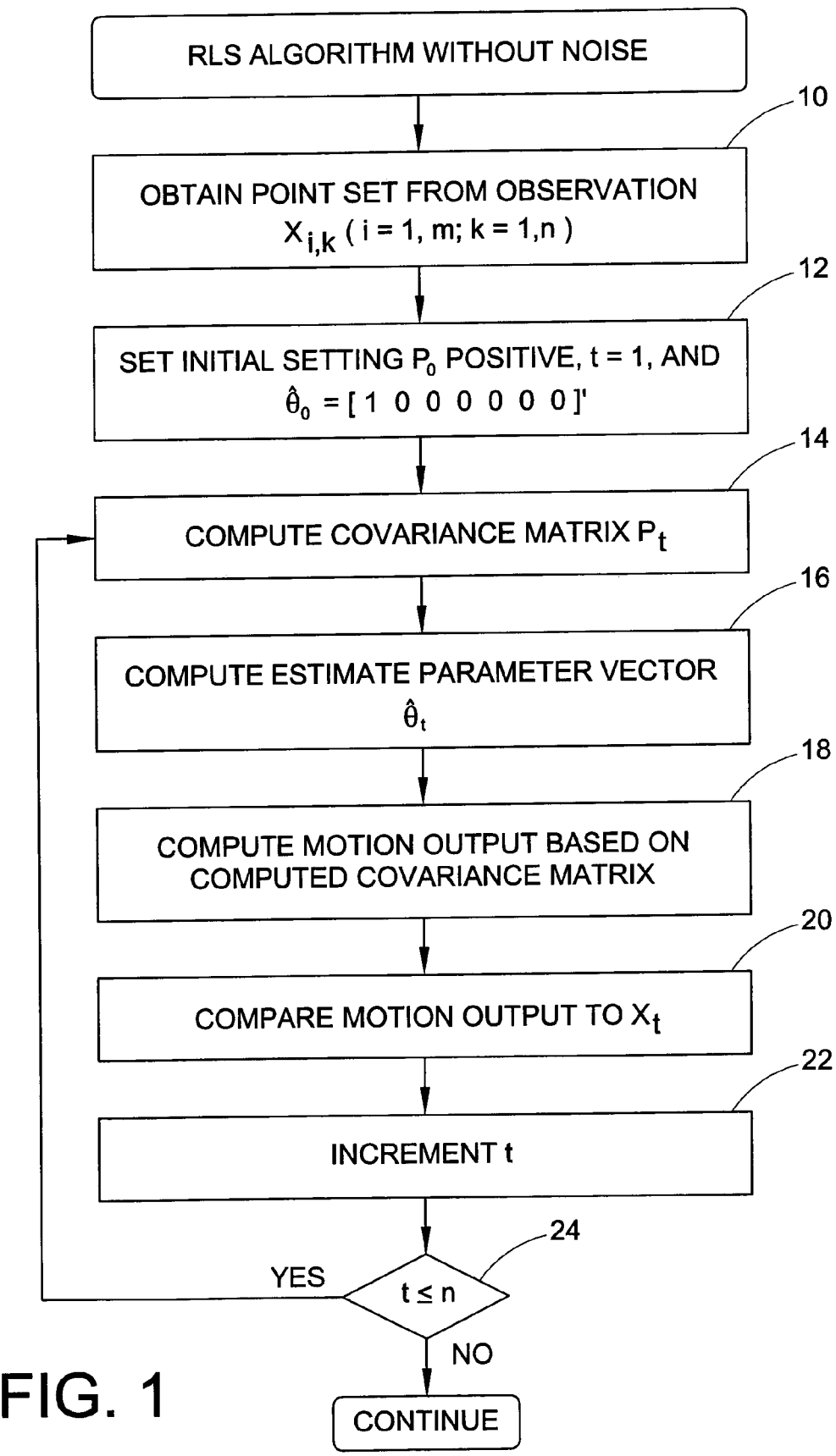
FIG. 1 is a flowchart describing the RLS algorithm without noise.

A preferred embodiment of the present invention uses a recursive least squares algorithm to estimate position and orientation of a moving camera that is subject to observation noise. The estimation of the 3-D motion parameters is obtained by identifying certain object features, such as, for example, a set of points or a line, that are located and matched in the images in the sequence taken by the camera. In the preferred embodiment, motion calibration is done by locating a set of feature points in the images. A moving camera and a static object is assumed herein, however, it is readily apparent that this is equivalent to estimating the 3-D motion of a moving object observed by a static camera.

The motion of a camera can be described as the motion of a point in 3-D space. Additionally, in a dynamic system, the motion can be described by evolution of a set of state variables, preferably including three rotation parameters and three translation parameters. If $X=[x_1\ x_2\ x_3]'$ is a point on a curve that describes the motion of the camera, subsequent points on the curve may be obtained by rotating X by a small angle $\alpha$ about an axis, e.g., A, and then by translating the rotated point by a translation vector, e.g., $T=[t_x\ t_y\ t_z]'$, where $t_x$, $t_y$, and $t_z$ are the above-described translation parameters. In vectors and matrices provided herein, the prime notation indicates a matrix transpose.

To determine the three rotation parameters, as widely known in the art, Euler angles, $\alpha_x$, $\alpha_y$, and $\alpha_z$, are calculated for the axis A. Rotation about A by the angle $\alpha$ is then equivalent to rotating about the Z-axis by $\alpha_z$, then rotating about the Y-axis by $\alpha_y$, and then rotating about the X-axis by $\alpha_x$. The rotation matrix for rotating about the axis A is the product of 3 rotation matrices about the coordinate axes as just described. Hence the model for rotation followed by translation can be written as:

$$X_{t+1}=RX_t+T \quad (1)$$

where $$R = \begin{bmatrix} 1 & \bar{\omega}_1 & \bar{\omega}_2 \\ -\bar{\omega}_1 & 1 & \bar{\omega}_3 \\ -\bar{\omega}_2 & -\bar{\omega}_3 & 1 \end{bmatrix} \quad (2)$$

The variables $\bar{\omega}_1$, $\bar{\omega}_2$ and $\bar{\omega}_3$ of the cumulative rotation matrix R are derived from the Euler angles described above and, along with $t_x$, $t_y$, and $t_z$, form a set of 6 motion parameters. It is to be appreciated by one skilled in the art that other 3D rotation matrices exist, and the present invention is not limited to the above-described rotation matrix.

Having established the form of the equation of motion, to estimate the camera motion parameters, the matrices R and T from Equation (1) are now identified. For these purposes, Equation (1) can be rewritten as in the following linear regression model:

$$y_t=\phi_t'\theta \quad (3)$$

where $$y=[x_1\ x_2\ x_3]' \quad (4)$$

$$\phi' = \begin{bmatrix} x_1 & x_2 & x_3 & 0 & 1 & 0 & 0 \\ x_2 & -x_1 & 0 & x_3 & 0 & 1 & 0 \\ x_3 & 0 & -x_1 & -x_2 & 0 & 0 & 1 \end{bmatrix} \quad (5)$$

$$\theta=[1\ \bar{\omega}_1\ \bar{\omega}_2\ \bar{\omega}_3\ t_x\ t_y\ t_z]' \quad (6)$$

Components of the matrix $\phi$ consist of the state variables $x_1$, $x_2$ and $x_3$. These state variables can be determined to certainty or they may be subject to noise. The vector $\theta$ essentially consists of the six above-described motion parameters and, therefore, $\theta$ is herein referred to as the parameter vector.

The model provided in Equation (3) describes the observed variable $y_t$ as an unknown linear combination of the components of the observed vector $\phi_t$. Assuming the data acquisition takes place in discrete time, then, at any time t, a sequence of measurements $y_1, y_2, \ldots, y_t$ is received. A data vector $y^t$ may then be defined by:

$$y^t=[y_t\ y_{t-1}\ \ldots\ y_1] \quad (7)$$

The primary goal of motion parameter identification is to obtain a model of the system such that the model has the same output as the observed data. The model is parameterized by an unknown parameter vector $\theta$. Therefore, the identification problem can be formulated as the determination of a transformation T from data $y^t$ to the model parameter $\theta$. The transformation may be represented symbolically as:

$$y^t \to \theta_{(t,y^t)} \quad (8)$$

In practice, $\theta$ may never be known, however, an estimate of $\theta$ can be obtained from information contained in $y^t$. Denoting a guess, or a prediction, of $\theta$ by $\hat{\theta}$, the corresponding transformation and estimate of system output are based on the following equations:

$$y^t \to \hat{\theta}_{(t,y^t)} \quad (9)$$

and $$\hat{y}_{(t|\theta)} = \phi_t' \hat{\theta} \quad (10)$$

Since there are limitations to collecting data in a finite time, the above procedure preferably terminates in some finite number of steps, e.g., N. Symbolically, this may be written as:

$$\hat{\theta}_N = \hat{\theta}_{(N,y^N)} \quad (11)$$

Because $\hat{\theta}$ is an estimate of $\theta$ based on information contained in $y^t$, it is, in general, a function of previous $y^t$ data and it depends on the previous value of $y_k(k=1, \ldots, t)$. However, in practice, computation time and memory space are restricted to an auxiliary memory space $S_t$ of fixed dimensions. This auxiliary vector is updated according to the following algorithm:

$$\hat{\theta}_t = F(\hat{\theta}_{t-1}, S_t, y_t) \quad (12)$$

where $$S_t = H(S_{t-1}, \hat{\theta}_{t-1}, y_t) \quad (13)$$

$F(\ldots)$ and $H(\ldots)$ of the above equations are functions described in further detail below. From Equations (12) and (13), it is seen that the estimate $\hat{\theta}$ is a function of current data, a previous estimate of the data, and an auxiliary variable $S_{(t)}$. Preferably, the only information that is stored at time t is $\hat{\theta}$ and $S_{(t)}$. The problem of recursive identification therefore is reduced to a suitable model parameterization and to appropriately choosing the functions $F(\ldots)$ and $H(\ldots)$. In order to choose the functions, if the error between the estimated output and the measurement is defined by $e_t$, then $$e_t = y_t - \hat{y}_{t|\theta} \quad (14)$$

or $$e_t = y_t - \phi_t' \hat{\theta} \quad (15)$$

A suitable approach is to find an estimate of $\phi_t'$ such that the corresponding error $e_t$ is minimal. A criterion function, denoted by $V_{(\hat{\theta},t)}$, is defined as a sum of the quadratic of the error, that is $$V_{(\hat{\theta},t)} = \frac{1}{2} \sum_{i=1}^{t} e_i^2 \quad (16)$$

Defining $$P_t = \sum_{i=1}^{t} [\phi_i \phi_i']^{-1} \quad (17)$$

it can be observed from Equations (16) and (17) that one may apply the recursive least squares (RLS) algorithm $$\hat{\theta}_t = \hat{\theta}_{t-1} + K_t [y_t - \phi_t' \hat{\theta}_{t-1}] \quad (18)$$

$$P_t = P_{t-1} + P_{t-1} \phi_t [I + \phi_t' P_{t-1} \phi_t]^{-1} \phi_{t-1}' P_{t-2} \quad (19)$$

where $$K_t = P_{t-1} \phi_t [I + \phi_t' P_{t-1} \phi_t]^{-1} \quad (20)$$

with initial conditions of $P_0$ positive, and $\hat{\theta}_0$ are given.

Functions $F(\ldots)$ and $H(\ldots)$ are now identified, and, with reference to FIG. 1, the RLS algorithm for the calibration is now described. At step 10, the point set from observation, $X_{i,k}(i=1,m; k=1,n)$, is obtained, where m is the number of points in the point set and n is the number of observations. At step 12, an iteration is initialized by setting $P_0$ positive, t=1, and $\hat{\theta}_0 = [1\ 0\ 0\ 0\ 0\ 0\ 0]'$.

Within the iteration, starting at step 14, the covariance matrix $P_t$ is computed and, at step 16, the estimate parameter vector $\hat{\theta}_t$ is computed. The motion output is then computed at step 18, based on step 14 above. The motion output from is then compared with $X_t$ at step 20, and steps 14-20 are repeated for $t \leq n$ (steps 22, 24).

In practice, the individual state variables of a dynamic system cannot be determined exactly by direct measurements. Instead, the measurements are functions of the state variables with random noise. The system itself may also be subject to random disturbances. In this case, the state variables are estimated from noisy observations.

A moving camera with noise can be modeled by adding a noise vector $e=[e_1\ e_2\ e_3]$ defining the rotation and translation noise, where $e_1, e_2, e_3$ are independent normally distributed random noise. Since the noise is additive, a transformation matrix c with diagonal entries $c_1, c_2, c_3$ may be defined. The model for rotation with translation and with noise can then be written as:

$$X_{t+1} = RX_t + T + ce \quad (21)$$

$$c = \begin{bmatrix} c_1 & 0 & 0 \\ 0 & c_2 & 0 \\ 0 & 0 & c_3 \end{bmatrix} \quad (22)$$

Equation (22) can be written in the same format as the model in Equation (3) as follows:

$$X_{k+1} = \phi_k' \theta \quad (23)$$

where $$X = [x_1\ x_2\ x_3] \quad (24)$$

$$\phi' = \begin{bmatrix} x_1 & x_2 & x_3 & 0 & 1 & 0 & 0 & e_1 & 0 & 0 \\ x_2 & -x_1 & 0 & x_3 & 0 & 1 & 0 & 0 & e_2 & 0 \\ x_3 & 0 & -x_1 & -x_2 & 0 & 0 & 1 & 0 & 0 & e_3 \end{bmatrix} \quad (25)$$

$$\theta' = [1\ \bar{\omega}_1\ \bar{\omega}_2\ \bar{\omega}_3\ t_x\ t_y\ t_z\ c_1\ c_2\ c_3] \quad (26)$$

Figure 2:
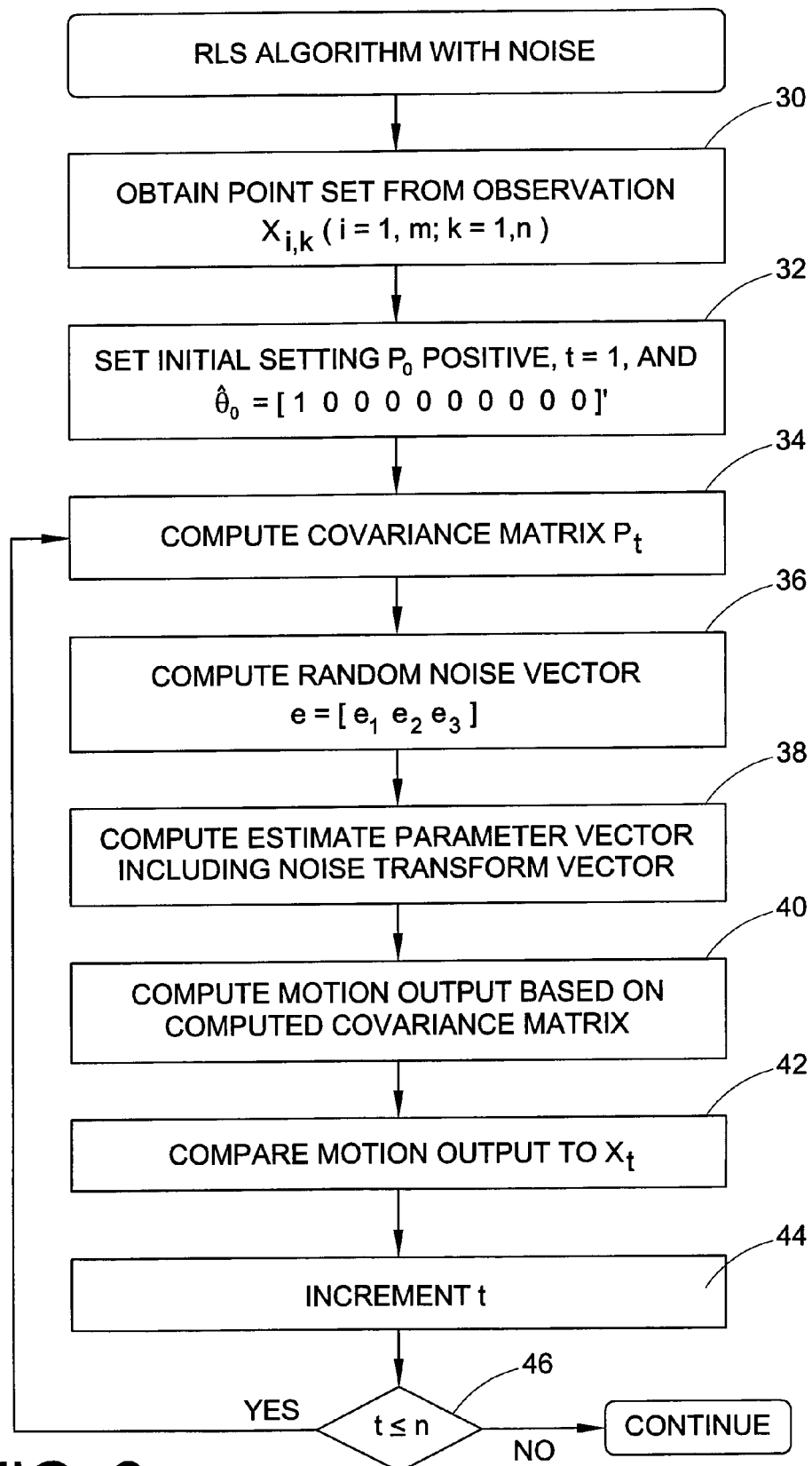
FIG. 2 is a flowchart describing the RLS algorithm with random noise.

Equations (19) and (20) can be applied to Equation (23), and a recursive least squares solution can be obtained for the model with noise as follows now with reference to FIG. 2. The point set from observation, $X_{i,k}(i=1,m; k=1,n)$, is obtained at step 30, where m is the number of points in the point set and n is the number of observations. At step 32, an iteration is initialized by setting $P_0$ positive, t=1, and $\hat{\theta}_0 = [1\ 0\ 0\ 0\ 0\ 0\ 0\ 0\ 0\ 0]'$. At step 34, within the iteration, the covariance matrix $P_t$ is computed, a random noise vector $e=[e_1\ e_2\ e_3]$ is computed at step 36, and at step 38, the estimate parameter vector $\hat{\theta}_t$ is computed including a transformation of the random noise. At step 40, the motion output is computed based on step 34 above, and, at step 42, the motion output is compared with $X_t$. Steps 34-42 are repeated for $t \leq n$ (steps 44, 46).

The design of a filter, in the preferred embodiment, is based on the differences between parameters generating the desired motion and parameters estimated based on the motion measurements. These differences form an additional dynamic system. The system provides a compensation transformation to bring the motion closer to the desired trajectory. Designating the desired rotation matrix by $R_d$ and the desired translation vector by $T_d$, the desired motion of the camera is described by $$X_{t+1} = R_d X_t + T_d \quad (27)$$

Further designating the estimated rotation matrix by $R_e$, the estimated translation vector by $T_e$, and the noise transformation matrix $c_e$, the estimated motion is described by $$X_{t+1} = R_e X_t + T_e + c_e e \quad (28)$$

The rotation matrix of the filter is the difference between the estimated rotation matrix and desired rotation matrix, and the translation vector of the filter is the difference between the estimated translation vector and the desired translation vector. Denoting the filter rotation matrix by $R_f$ and the filter translation vector by $T_f$, then $R_f = R_e - R_d$ and $T_f = T_e - T_d$. These filter matrices are the filter state parameters, and the sequence of images taken by the camera provide the input to the filter. Using the image input, corrected outputs are generated by the following motion model:

$$X_{t+1} = R_f X_t + T_f + c_e e \quad (29)$$

As an illustration, consider a camera that is designed to move along a straight line determined by the X-axis, with a constant camera orientation. Then an effective system should identify, and filter, any non-zero rotation and translation parameters along the Y-axis and the Z-axis.

Figure 3:
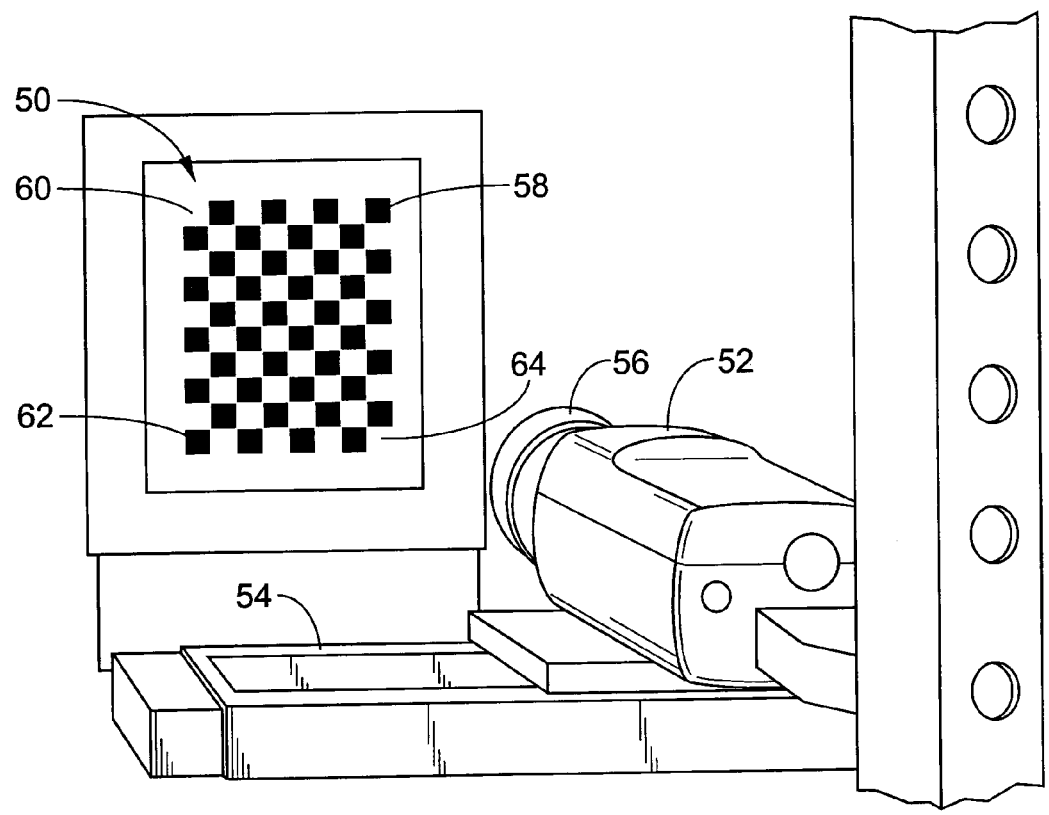
FIG. 3 is an exemplary system for performing validation experiments according to the present invention.

With reference now to FIG. 3, a setup is shown in order to demonstrate how an exemplary camera motion system is set up and how the camera motion is measured. A black and white checkerboard 50 is used as the subject for the set of digital images that are input to the system. The data are collected as the camera 52 moves along a slider 54. The path of the slider represents the predetermined path for the system.

A camera that is allowed to move from one end of a slider to the other is said to be in straight-line motion. In this case, the slider 54 is set up so that it is parallel to the checkerboard 50, and it is assumed that the camera sensor 56 is parallel to the checkerboard 50.

Assuming the slider 54 represents the X-axis in camera coordinates, the camera moves from one end of the slider 54 to the other in a set of discrete steps. At each step, an image is taken of the checkerboard 50. In this example shown, the step size is 2 mm, and 201 images are collected. Each collected image contains a full view of the checkerboard. A corner detection algorithm is used to determine the corner positions 58, 60, 62 and 64 on the checkerboard 50 in each collected frame. A simple matching algorithm is used to match the corners from frame to frame. A sequence of points determined by the image sequence forms an observed trajectory, and the points over the slider form a desired point trajectory. One particular experiment yielded the results shown in FIG. 4. Compared with the desired point trajectory 66, it is seen that there is an error of about 3 pixels along the Y-axis 68, and there is an error of about 8 pixels along the Z-axis 70 for the observed trajectory 72.

Figure 4:
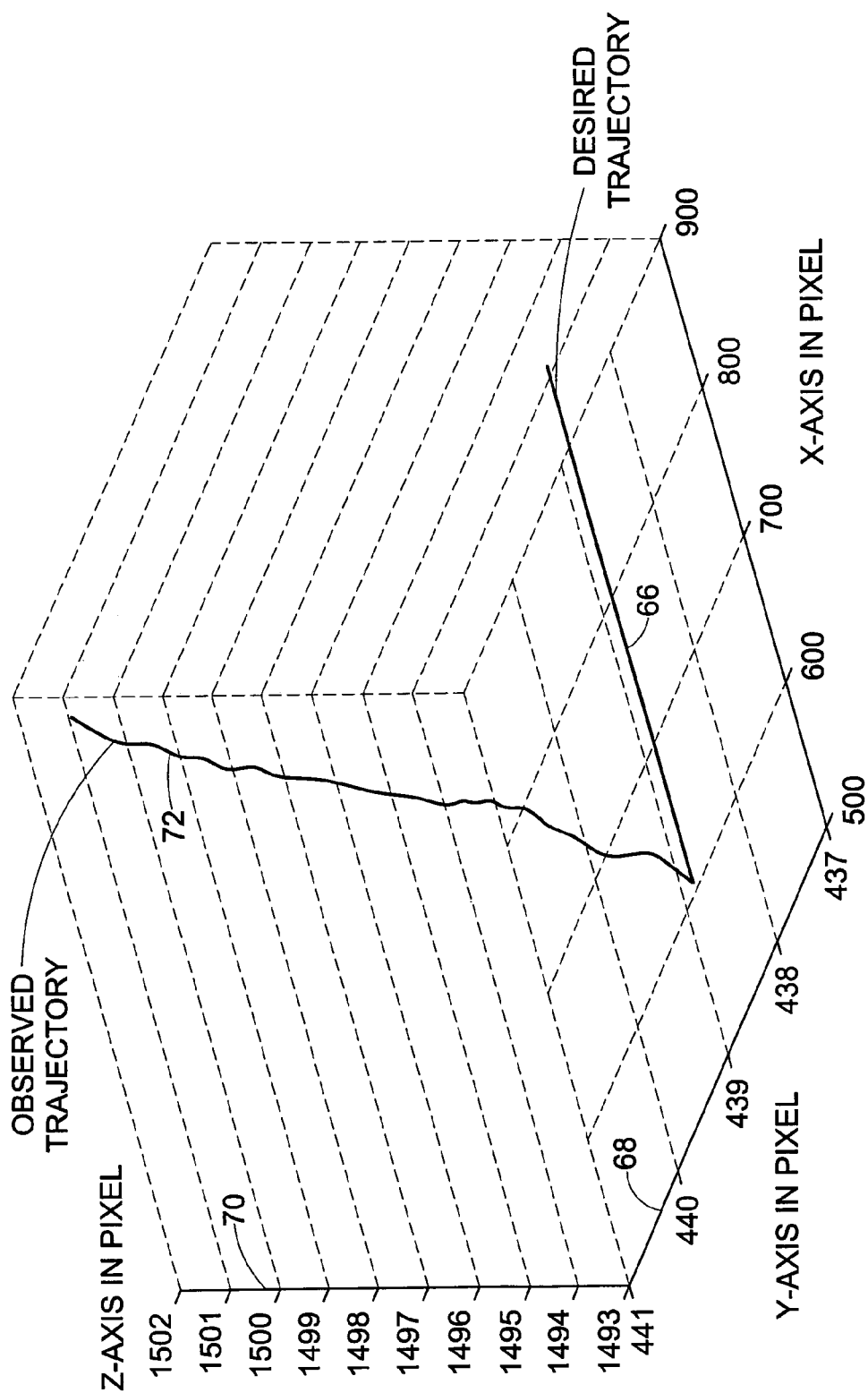
FIG. 4 is a plot of an exemplary observed point trajectory compared to a desired point trajectory.

The ability of the RLS algorithm to perform camera motion parameter estimation is now demonstrated. A sequence of 3-D points from the observed point sequence 72 in FIG. 4 is used as the observed values for Equation (19). Values as large as $10^{12}$ are used for the initial value of the covariance matrix $P_0$. The initial estimate parameter vector $\hat{\theta}_0$ is set to [1 0 0 0 0 0 0 0 0]'. The initial noise matrix is initialized as $c_{(1,1)}=0.05$, $c_{(2,2)}=0.06$ and $c_{(3,3)}=0.05$. A set of 201 unit random, white, noisy points, together with the parameter vector of Equation (27) and the state matrix of Equation (26) are used. The RLS algorithm is allowed to continue through 200 iterations (n=200).

Figure 5:
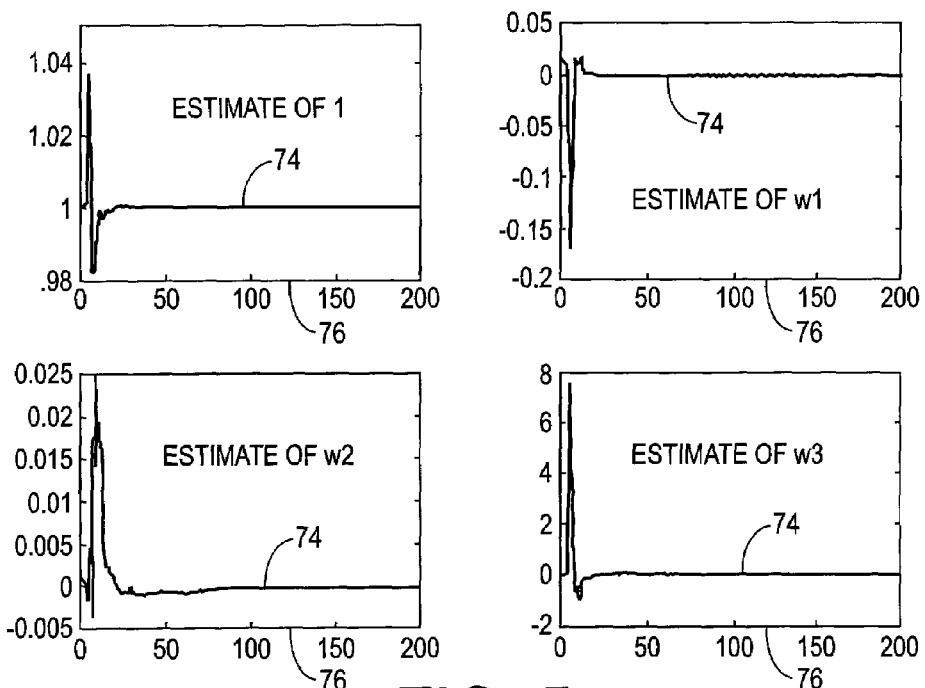
FIG. 5 is a plot of exemplary rotation variables for the RLS algorithm.
Figure 6:
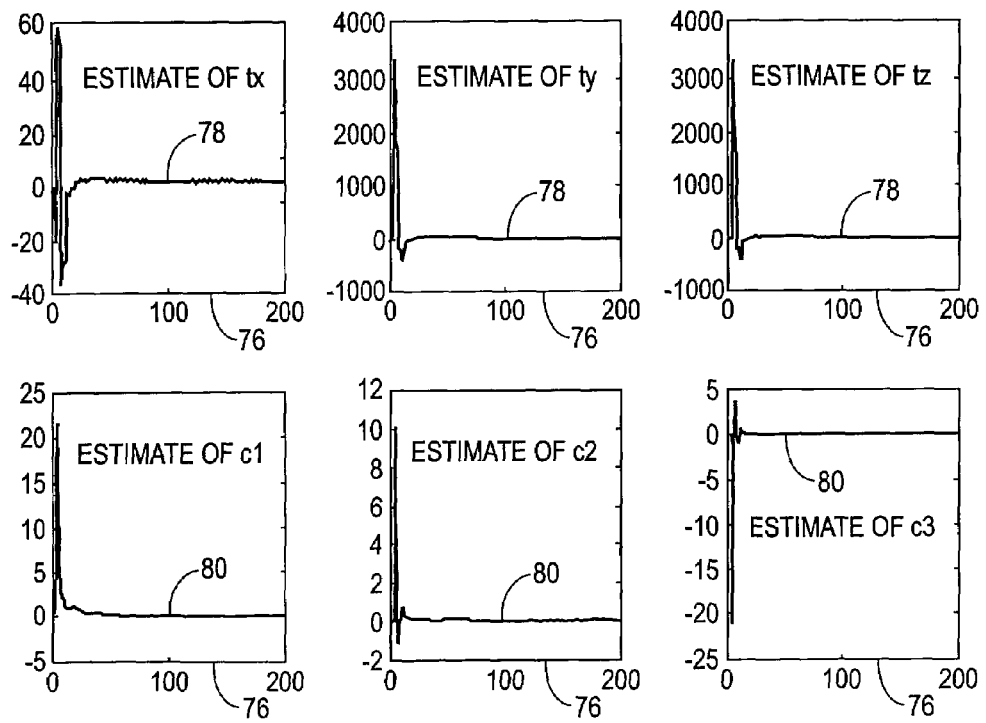
FIG. 6 is a plot of exemplary translation and noise variables for the RLS algorithm.

With reference to FIG. 5, the resulting rotation variables 74 are plotted versus the iteration count 76 for each image frame used in the RLS algorithm. Likewise, with reference to FIG. 6, translation variables 78 and noise variables 80 are plotted against the iteration count 76.

Figure 7:
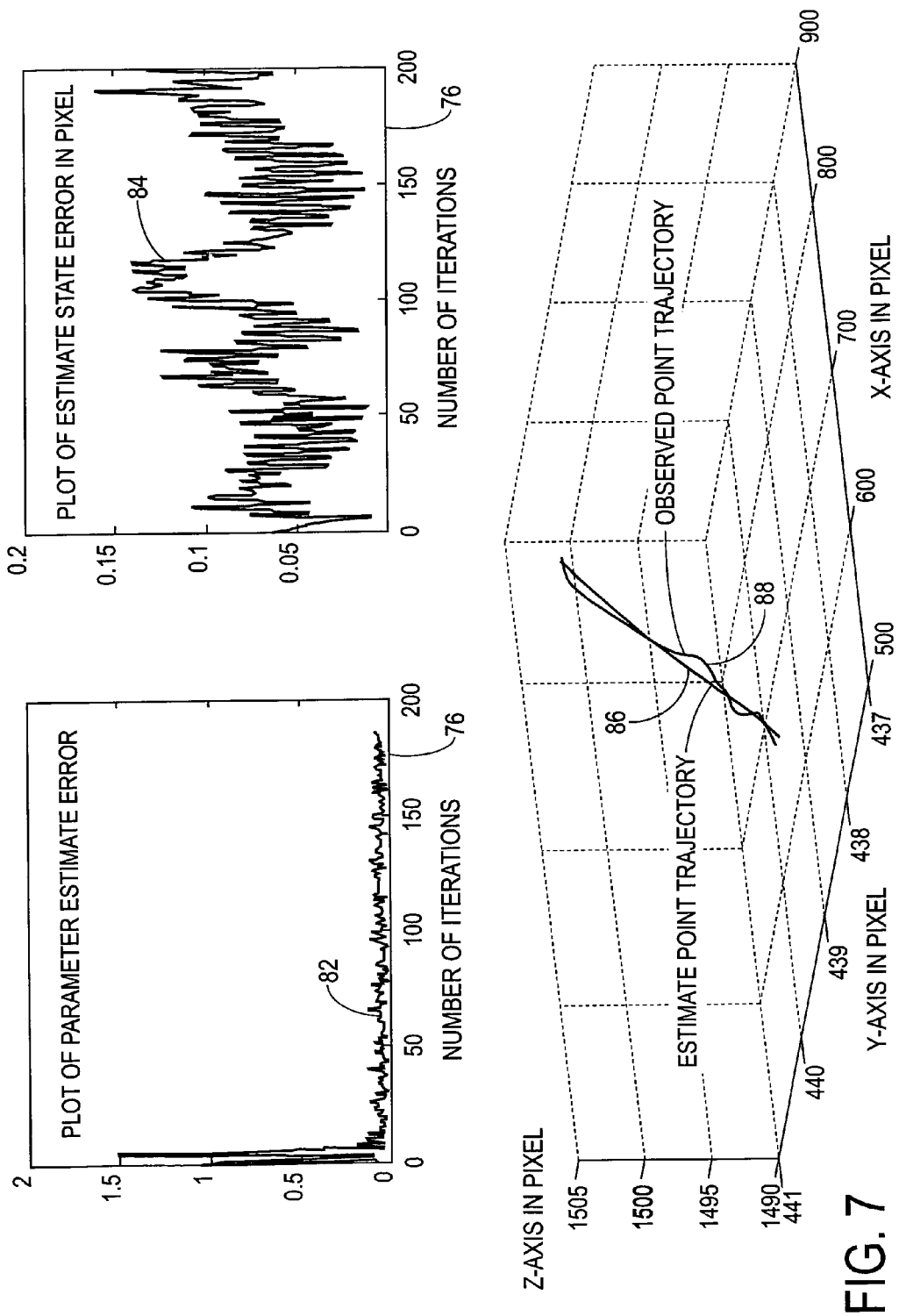
FIG. 7 is a plot of exemplary parameter and state estimate errors for the RLS algorithm.

It can be readily observed that the estimation of the parameter vector reaches a stable value after about 20 iterations. A set of the computed estimation is obtained and the error of the parameter 82 and state estimation 84 are plotted in FIG. 7. The final computed estimation parameters are:

| Estimated rotation variables: | 0.0000 | −0.0004 | −0.0008 |
| --- | --- | --- | --- |
| Estimated translation variables: | 2.2705 | 1.2526 | −0.6351 |
| Estimated noise variables: | 0.0211 | 0.0144 | 0.0046 |

After the error parameter estimates are made, they are used to construct a model of the motion and to compare it to the observed point trajectory. The graph shows good agreement between the predicted motion 86 and the actual motion 88.

A filter based on the difference between the desired motion and estimated motion is now constructed, and the ability of the filter to correct the camera motion is demonstrated. Estimated rotation and translation parameters are used to calculate the difference from the desired motion. The estimated motion forms a rotation matrix and a translation vector with $$R = \begin{bmatrix} 1 & 0 & -0.0004 \\ 0 & 1 & -0.0008 \\ 0.0004 & 0.0008 & 1 \end{bmatrix}$$

and T=[2.2705 1.2526 −0.6351]'.

Figure 8:
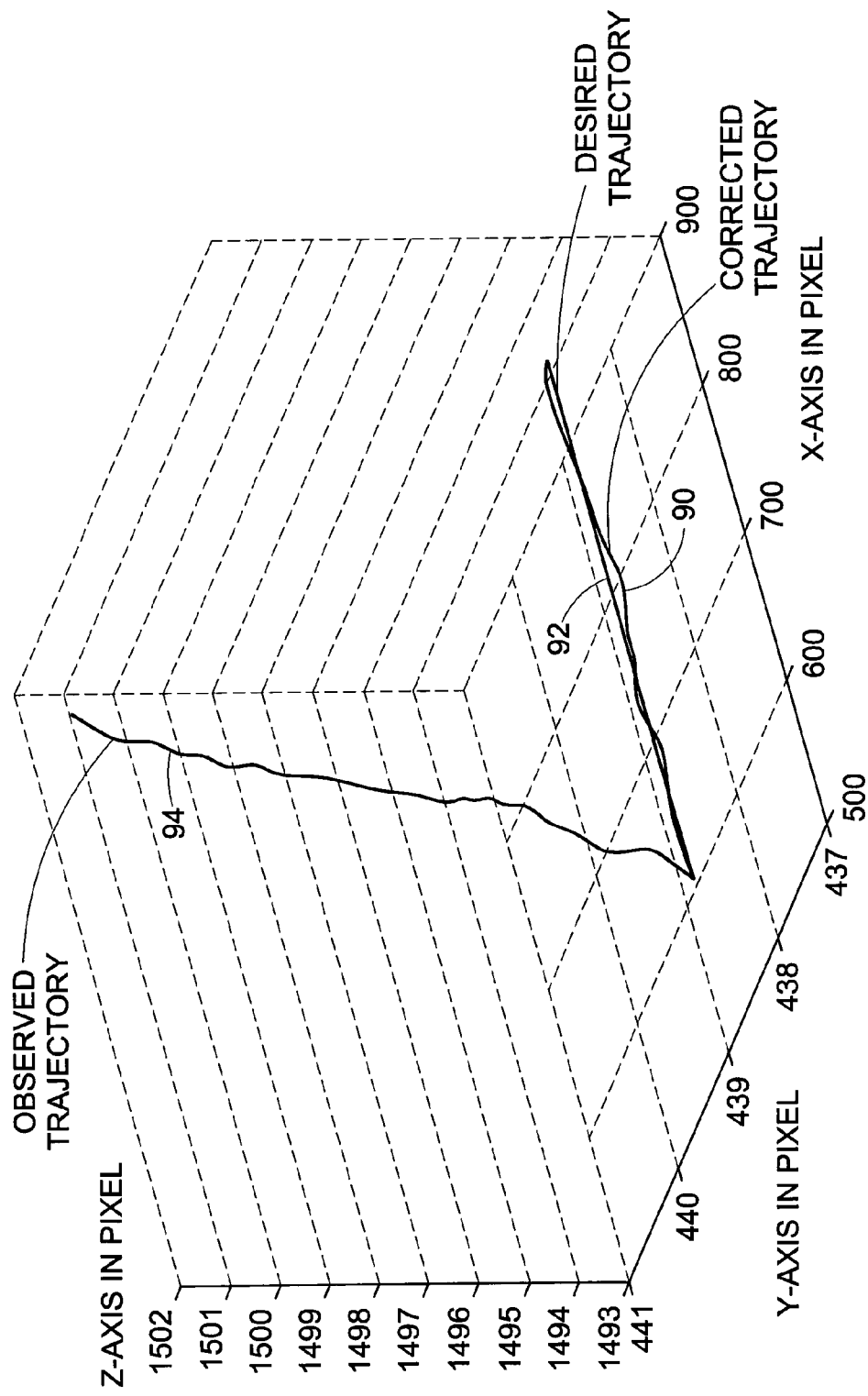
FIG. 8 is a 3-D graph showing a corrected point trajectory, an observed point trajectory, and a desired point trajectory.

The desired motion is linear (along the X-axis) with no rotation. Therefore, the desired rotation matrix is the 3×3 identity matrix I. A rotation matrix of R-I is used to rotate the observed point and a translation vector of T-$T_d$, where $T_d$=[$t_{dx}$ 0 0]', and $T_{dx}$ is the desired moment for each step in pixels, is used to translate the observed point to the corrected point. With reference now to FIG. 8, it can be observed that the filter outputs of the corrected point form a motion trajectory 90 close to the desired point trajectory 92 compared with the observed point trajectory 94. In this experiment, the error between two trajectories is defined as the distance between two corresponding points from the two trajectories. The average of error between the filter output trajectory 90 and the desired output trajectory 92 is approximately 0.27 pixel compared with approximately 2.5 pixel of error between the observed trajectory 94 and the desired output trajectory 92. The maximum of error between the filter output trajectory 90 and the desired output trajectory 92 is approximately 0.45 pixel compared with approximately 7.3 pixel of error between the observed trajectory 94 and the desired output trajectory 92.

Figure 9:
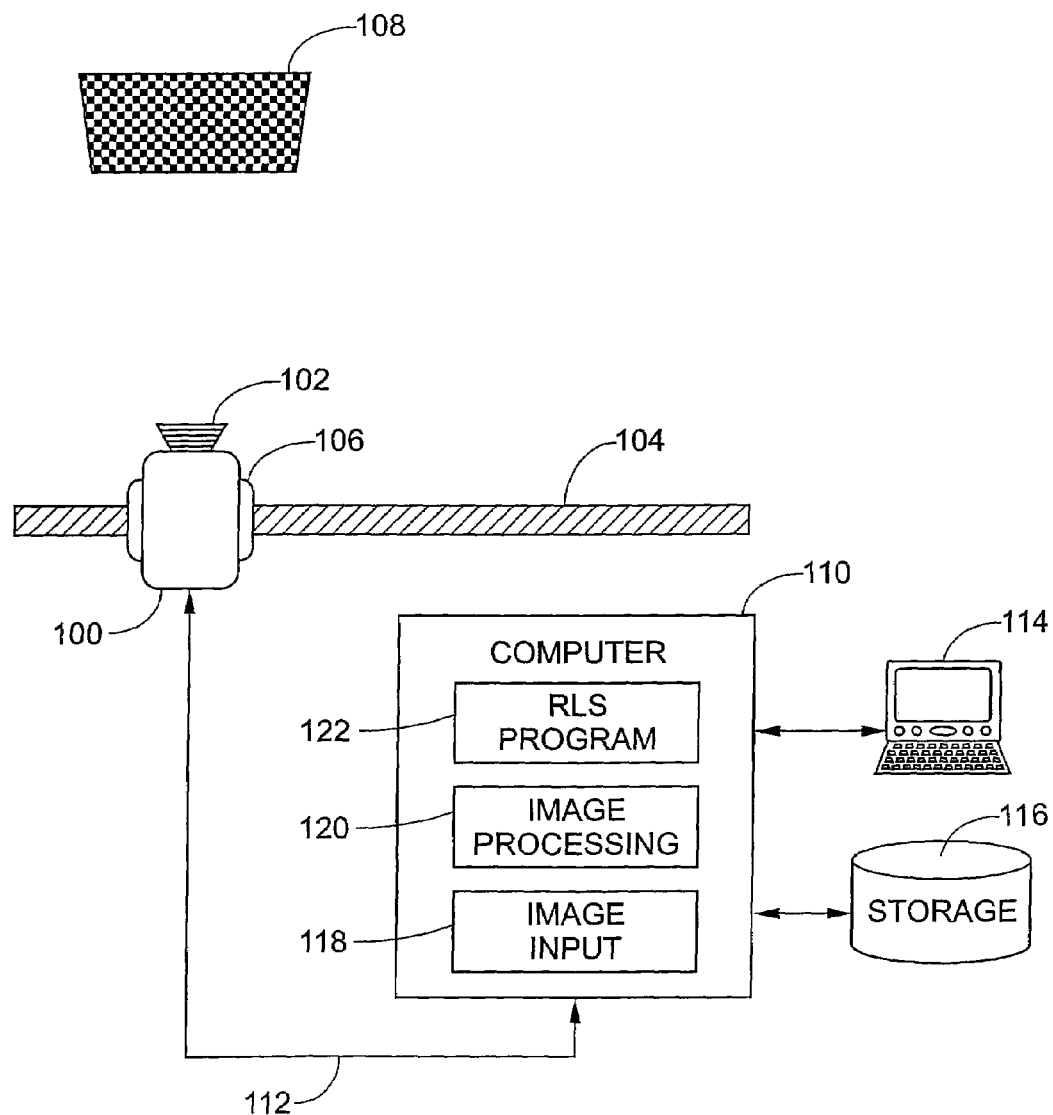
FIG. 9 is a system incorporating an embodiment of the present invention.

With reference now to FIG. 9, an exemplary system, suitable for incorporating embodiments of the present invention is shown. A digital camera 100, including a lens/sensor 102 is movably mounted on a track 104. A camera control and movement means 106, e.g., an electric motor, drive system, etc., is provided to control movement and rotation of the camera along the track 104 which, in this exemplary embodiment, comprises the X-axis. It is to be appreciated, however, that the track 104, and the movement means 106 are shown only for purposes of understanding the present invention. The movement means may just as well comprise a moving vehicle, such as an automobile, and the motion may be allowed 3-dimensionally, along 3 axes, not constrained to a single linear axis. The figure also shows an object 108 which, similarly, may be a room, or even an outdoor scene. In the case of a room, or a confined outdoor area, the track 104 movement means 106 may be a cable system supporting the camera, thereby enabling controlled motion of the camera in an essentially planar fashion. The object 108, however, is useful for testing and calibration of the system as previously described.

A computer system 110 is shown connected to the camera by communication means 112 which may be a network, cable or wireless connection. While the computer system 110 is shown in the figure as being connected directly to the camera, it is to be appreciated that the camera 100 may be used to accumulate images in an offline environment, wherein the images are then transferred to the computer system 110 for processing at a later time.

The computer system 110 includes a user interface 114 and a storage means 116 for storing programs and image data collected from the camera 100. The storage means may comprise a random access disk system, tape storage devices and/or random access solid-state memory devices. An image input program 118 is provided for receiving image input from the camera 100, and image processing programs 120 are further provided for processing the images, and storing the images on the storage means 116. An RLS program 122 is provided which is programmed to perform the above-describe RLS algorithm, including calibration, modeling camera motion without noise, modeling camera motion with noise, and correcting an observed trajectory by means of the above-described filter.

The invention has been described with reference to the preferred embodiments. Modifications and alterations will occur to others upon a reading and understanding of the specification. It is our intention to include all such modifications and alterations insofar as they come within the scope of the appended claims, or the equivalents thereof.

What is claimed is:

1. A method for estimating camera motion parameters, the method comprising:
   obtaining an observation point set including a plurality of observed point vectors;
   computing a plurality of motion output vectors by performing a recursive least squares (RLS) process based on a plurality of motion parameter vectors; and,
   comparing the plurality of motion output vectors to the plurality of observed point vectors;
   wherein the computing a plurality of motion output vectors and the comparing the plurality of motion output vectors to the plurality of observed point vectors comprise:
   initializing a first covariance matrix to a positive value;
   setting a first motion parameter estimate vector to an initial value;
   determining each of the plurality of motion parameter vectors, the determining comprising: computing a current covariance matrix;
   computing a current motion parameter estimate vector based on the current covariance matrix; computing a current motion output vector and a current state variable matrix based on the current covariance matrix; and,
   comparing the current motion output vector to the observation point set; and, repeating the determining a predetermined number of times;
   wherein: the computing a current covariance matrix comprises computing $P_t = P_{t-1} + P_{t-1}\phi_t[I+\phi_t'P_{t-1}\phi_t]^{-1}\phi_{t-1}'P_{t-2}$, $P_t$ being the current covariance matrix, $P_{t-1}$ being the prior current covariance matrix, $P_{t-2}$ being the second prior current covariance matrix, $\phi_t$ being the current state variable matrix, $\phi_{t-1}$ being the prior current state variable matrix, and I being the identity matrix; and,
   the computing a current motion parameter estimate vector comprises computing $\hat{\theta}_t = \hat{\theta}_{t-1} + [P_{t-1}\phi_t[I+\phi_1'P_{t-1}\phi_t]^{-1}][y_t - \phi_t\hat{\theta}_{t-1}]$, $\hat{\theta}_t$ being the current motion parameter estimate, $\hat{\theta}_{t-1}$ being the prior current motion parameter estimate, and y, being the current motion output vector.

2. The method as set forth in claim 1, wherein the obtaining includes obtaining m number of points and n number of observations for each of the m number of points; and the repeating includes repeating the determining n times.

3. The method as set forth in claim 2, wherein the setting a first motion parameter estimate vector comprises setting the first motion parameter estimate vector equal to [1 0 0 0 0 0 0]'.

4. The method as set forth in claim 1, wherein: the determining further includes computing a random noise vector of the form $e = [e_1\ e_2\ e_3]$;
   the computing a current motion parameter estimate vector includes computing the current motion parameter estimate vector which includes a plurality of noise vector transformation parameters; and,
   the computing a current motion output vector includes computing the current motion output vector which includes a transformation of the random noise vector.

5. The method as set forth in claim 4, wherein the obtaining includes obtaining m number of points and n number of observations for each of the m number of points; and the repeating includes repeating the determining n times.

6. The method as set forth in claim 5, wherein the setting a first motion parameter estimate vector comprises setting the first motion parameter estimate vector equal to [1 0 0 0 0 0 0 0]'.

7. The method as set forth in claim 6, wherein:
   the computing a current covariance matrix comprises computing $P_t = P_{t-1} + P_{t-1}\phi_t[I+\phi_t'P_{t-1}\phi_t]^{-1}\phi_{t-1}\ 'P_{t-2}$, $P_t$ being the current covariance matrix, $P_{t-1}$ being the prior current covariance matrix, $P_{t-2}$ being the second prior current covariance matrix, $\phi_t$ being the current state variable matrix including one of the plurality of random noise vectors, $\phi_{t-1}$ being the prior current state variable matrix, and I being the identity matrix; and,
   the computing a current motion parameter estimate vector comprises computing $\hat{\theta}_t = \hat{\theta}_{t-1} + [P_{t-1}\phi_t[I+\phi_t'P_{t-1}\phi_t]^{-1}][y_t - \phi_t\hat{\theta}_{t-1}]$, $\hat{\theta}_t$ being the current motion parameter estimate including the transformed one of the plurality of noise vectors, $\hat{\theta}_{t-1}$ being the prior current motion parameter estimate, and $y_t$ being the current motion output vector.

8. A method for determining a filter to correct for camera motion errors, the method comprising:
   determining a plurality of desired motion point vectors;
   computing a plurality of estimated motion point vectors by means of an RLS algorithm; and,
   computing the filter based on a difference between the plurality of estimated motion point vectors and the plurality of desired motion point vectors, wherein:
   the determining a plurality of desired motion point vectors comprises determining the desired motion as described by $X_{t+1}=R_d X_t+T_d$, where $X_t$ is the motion output matrix at time t, $X_{t-1}$ is the motion output matrix at time t+1, $R_d$ is the desired rotation matrix, and $T_d$ is the desired translation vector;
   the computing a plurality of estimated motion point vectors comprises computing the estimated motion as described by $X_{t-1}=R_e X_t+T_e+c_e e$, where $R_e$ is the estimated rotation matrix, $T_e$ is the estimated translation vector, $c_e$ is a noise transformation matrix, and e is a random noise vector; and,
   the computing the filter comprises:
      computing a filter rotation matrix according to $R_f=R_e-R_d$; and,
      computing a filter translation vector according to $T_f=T_e-T_d$.

9. The method as set forth in claim 8, further comprising computing a corrected output according to $X_{t-1}=R_f X_t+T_f+c_e e$.

10. The method as set forth in claim 9, wherein the RLS algorithm comprises:
    obtaining an observation point set including a plurality of observed vectors;
    initializing a first covariance matrix to a positive value;
    setting a first motion parameter estimate vector to an initial value;
    determining each of a plurality of motion parameter vectors, the determining each of a plurality of motion parameter vectors comprising:
       computing a current covariance matrix;
       computing a random noise vector;
       computing a current motion parameter estimate vector based on the current covariance matrix, the current motion parameter estimate vector including the noise transformation matrix;
       computing a current motion output vector and a current state variable matrix based on the current covariance matrix, the current motion output vector including the transformed random noise vector; and,
       comparing the current motion output vector to the observation point set; and,
    repeating the determining a predetermined number of times.

11. The method as set forth in claim 10, wherein the obtaining includes obtaining m number of points and n number of observations for each of the m number of points; and the repeating includes repeating the determining n times.

12. The method as set forth in claim 11, wherein:
    the initializing a first covariance matrix comprises initializing the first covariance matrix to a large positive value; and,
    the setting a first motion parameter estimate vector comprises setting the first motion parameter estimate vector to [1 0 0 0 0 0 0 0 0]'.

13. The method as set forth in claim 12, wherein:
    the computing a current covariance matrix comprises computing $P_t=P_{t-1}+P_{t-1}\phi_t[I+\phi_t'P_{t-1}\phi_t]^{-1}\phi_{t-1}'P_{t-2}$, $P_t$ being the current covariance matrix, $P_{t-1}$ being the prior current covariance matrix, $P_{t-2}$ being the second prior current covariance matrix, $\phi_t$ being the current state variable matrix, $\phi_{t-1}$ being the prior current state variable matrix, and I being the identity matrix; and,
    the computing a current motion parameter estimate vector comprises computing $\hat{\theta}_t=\hat{\theta}_{t-1}+[P_{t-1}\phi_t[I+\phi_t'P_{t-1}\phi_t]^{-1}][y_t-\phi_t\hat{\theta}_{t-1}]$, $\hat{\theta}_t$ being the current motion parameter estimate, $\hat{\theta}_{t-1}$ being the prior current motion parameter estimate, and $y_t$ being the current motion output vector.

14. A system for estimating and filtering camera motion parameters, the system comprising:
    a movable digital camera for generating a plurality of 2-dimensional images of a scene or object;
    a control means for translating and rotating the camera along a predetermined trajectory;
    a computer system for receiving and processing the plurality of 2-dimensional images, the computer system including:
    a user interface for receiving instructions from a user and for providing output to a user;
    an image input means for receiving the plurality of 2-dimensional images from the camera;
    a storage means for storing programs and the plurality of images;
    a program to determine a desired motion, the desired motion described by $X_{t+1}=R_d X_t+T_d$, where $X_t$ is the motion output matrix at time t, $X_{t+1}$ is the motion output matrix at time t+1, $R_d$ is the desired rotation matrix, and $T_d$ is the desired translation vector; and,
    a program to compute an estimated motion by means of an RLS program, the estimated motion described by $X_{t+1}=R_e X_t+T_e+c_e e$, where $R_e$ is the estimated rotation matrix, $T_e$ is the estimated translation vector, $c_e$ is a noise transformation matrix, and e is a random noise vector.

15. The system as set forth in claim 14, further comprising:
    a program to compute a filter rotation matrix according to $R_f=R_e-R_d$;
    a program to compute a filter translation vector according to $T_f=T_e-T_d$; and,
    a program to compute a corrected output according to $X_{t+1}=R_f X_t+T_f+c_e e$.

16. The system as set forth in claim 14, wherein the RLS program includes:
    a program to obtain an observation point set including a plurality of observed vectors;
    a program to initialize a first covariance matrix to a positive value;
    a program to set a first motion parameter estimate vector to an initial value;
    a program to determine each of a plurality of motion parameter vectors, including:
       a program to compute a current covariance matrix;
       a program to compute a random noise vector;
       a program to compute a current motion parameter estimate vector based on the current covariance matrix, the current motion parameter estimate vector including the noise transformation matrix;

a program to compute a current motion output vector and a current state variable matrix based on the current covariance matrix, the current motion output vector including the transformed random noise vector; and, a program to compare the current motion output vector to the observation point set; and, a program to repeatedly use the program to determine each of a plurality of motion parameter vectors a predetermined number of times.

17. The method as set forth in claim 16, wherein:

the RLS program is configured to obtain m number of points and n number of observations for each of the m number of points;

the program to repeatedly use the program to determine each of a plurality of motion parameter vectors is configured to repeatedly use the program to determine each of a plurality of motion parameter vectors n times;

the program to set a first motion parameter estimate vector is configured to set the first motion parameter estimate vector to [1 0 0 0 0 0 0 0 0]';

the program to compute a current covariance matrix is configured to compute $P_t = P_{t-1} + P_{t-1}\phi_t[I+\phi_t'P_{t-1}\phi_t]^{-1}\phi_{t-1}P_{t-2}$, $P_t$ being the current covariance matrix, $P_{t-1}$ being the prior current covariance matrix, $P_{t-2}$ being the second prior current covariance matrix, $\phi_t$ being the current state variable matrix, $\phi_{t-1}$ being the prior current state variable matrix, and I being the identity matrix; and, the program to compute a current motion parameter estimate vector is configured to compute $\hat{\theta}_t = \hat{\theta}_{t-1} + [P_{t-1}\phi_t[I+\phi_t'P_{t-1}\phi_t]^{-1}][y_t - \phi_t\hat{\theta}_{t-1}]$, $\hat{\theta}_t$ being the current motion parameter estimate, $\hat{\theta}_{t-1}$ being the prior current motion parameter estimate, and $y_t$ being the current motion output vector.

* * * * *